(12) United States Patent
Shim

(10) Patent No.: US 9,800,120 B2
(45) Date of Patent: Oct. 24, 2017

(54) MOTOR

(71) Applicant: LG INNOTEK CO., LTD., Seoul (KR)

(72) Inventor: Woo Seob Shim, Seoul (KR)

(73) Assignee: LG INNOTEEK CO., LTD., Seoul (KR)

( * ) Notice: Subject to any disclaimer, the term of this patent is extended or adjusted under 35 U.S.C. 154(b) by 415 days.

(21) Appl. No.: 13/923,847

(22) Filed: Jun. 21, 2013

(65) Prior Publication Data

US 2013/0342071 A1    Dec. 26, 2013

(30) Foreign Application Priority Data

Jun. 22, 2012  (KR) .................. 10-2012-0067333

(51) Int. Cl.
    *H02K 13/00*    (2006.01)
    *H02K 13/10*    (2006.01)
    (Continued)

(52) U.S. Cl.
    CPC ........... *H02K 11/001* (2013.01); *H02K 3/527* (2013.01); *H02K 13/006* (2013.01); *H02K 13/105* (2013.01); *H01R 39/46* (2013.01)

(58) Field of Classification Search
    CPC .... H02K 11/001; H02K 13/006; H02K 3/527; H02K 13/105; H02K 13/10; H02K 5/143;
    (Continued)

(56) References Cited

U.S. PATENT DOCUMENTS 4,757,602 A * 7/1988 Evenson ............... H01R 43/06
                                                            29/597
5,274,292 A * 12/1993 Lemmer ............... H01R 39/08
                                                            29/597
(Continued)

FOREIGN PATENT DOCUMENTS

JP    60-132173 U    9/1985
JP    2004-96837 A   3/2004
(Continued)

OTHER PUBLICATIONS

Office Action dated Jan. 31, 2017 in Japanese Application No. 2013130495.

(Continued)

*Primary Examiner* — Naishadh Desai
*Assistant Examiner* — Alexander Moraza
(74) *Attorney, Agent, or Firm* — Saliwanchik, Lloyd & Eisenschenk

(57) ABSTRACT

Disclosed is a motor, the motor according to an exemplary embodiment of the present disclosure including a stator arranged at an inner surface of a housing and including a magnet, a rotor core centrally arranged at the stator to pass through a rotation shaft, a rotor including an insulator covering the rotor core and a coil wound on the insulator, a commutator coupled to the rotation shaft to be electrically connected to the coil, and a brush coupled to the housing to be closely contacted to the commutator, wherein the insulator is formed with a short-circuit prevention unit formed on a drop path of conductive particles in order to prevent the short-circuit between the rotor core and the commutator from being generated by the conductive particles generated by the commutator and the brush.

11 Claims, 2 Drawing Sheets

(51) Int. Cl.
*H01R 39/46* (2006.01)
*H02K 11/00* (2016.01)
*H02K 3/52* (2006.01)

(58) Field of Classification Search
CPC ........ H02K 5/145; H02K 39/46; H02K 39/50;
H02K 39/14; H02K 39/16; H01R 39/46;
H01R 39/50; H01R 43/06
USPC ..... 310/220, 194, 215, 216, 233, 264, 68 D,
310/196, 237, 235, 239, 236, 400, 221,
310/222, 225, 404, 406, 407, 410, 411,
310/416, 216.114, 216.115, 216.116, 214,
310/270
See application file for complete search history.

(56) References Cited

U.S. PATENT DOCUMENTS

| | | | | |
|---|---|---|---|---|
| 6,157,102 A * | 12/2000 | Suzuki | ...................... | H02K 1/24 310/216.067 |
| 7,200,917 B2 * | 4/2007 | Takano et al. | .................. | 29/596 |
| 8,093,779 B2 * | 1/2012 | Hiramatsu et al. | ........... | 310/208 |
| 2003/0098630 A1 * | 5/2003 | Owada et al. | ................. | 310/259 |
| 2004/0095036 A1 * | 5/2004 | Yamamoto et al. | ........... | 310/233 |
| 2004/0155550 A1 * | 8/2004 | Yamamoto | ................ | H02K 1/24 310/194 |
| 2007/0096582 A1 * | 5/2007 | Kageyama et al. | ........... | 310/204 |
| 2007/0257572 A1 * | 11/2007 | Nakano | ..................... | H02K 1/24 310/68 D |
| 2008/0030098 A1 | 2/2008 | Shawcross | | |
| 2013/0009512 A1 * | 1/2013 | Tashiro et al. | ................. | 310/215 |
| 2014/0091670 A1 * | 4/2014 | Chun | ........................ | H02K 3/46 310/214 |

FOREIGN PATENT DOCUMENTS

| | | |
|---|---|---|
| JP | 2005204459 A | 7/2005 |
| JP | 2007060842 A | 3/2007 |
| JP | 2011-167004 A | 8/2011 |

OTHER PUBLICATIONS

Office Action dated Aug. 22, 2017, in Japanese Application No. 2013-130495.

* cited by examiner

MOTOR

CROSS-REFERENCE TO RELATED APPLICATION

This application claims the benefit under 35 U.S.C. §119 of Korean Application No. 10-2012-0067333, filed Jun. 22, 2012, which is hereby incorporated by reference in its entirety.

BACKGROUND OF THE DISCLOSURE

Field of the Disclosure

The present disclosure relates to a motor configured to prevent a dielectric breakdown caused by conductive particles.

Discussion of the Related Art

In general, a brush type motor is configured such that a stator is arranged with a magnet, a rotor core of a rotor wrapped by the stator is wound with a coil, a rotation shaft coupled to the rotor core is arranged with a commutator, and the commutator is brought into contact with a rod-shaped conductive brush applied with an electric power from outside.

In a case the commutator is rotated at a high speed while the brush is in contact with the commutator, fine conductive particles are continuously generated between the brush and the commutator, and the generated particles are accumulated and attached on an upper surface of the rotor core, whereby the conductive particles are further accumulated and attached to create various problems such as an electrical short-circuit between a commutator bar of the commutator and the rotor core, as the brush type motor increases in use.

BRIEF SUMMARY

The present disclosure is directed to cope with the above-mentioned problems/disadvantages and it is an object of the present disclosure to provide a motor configured to prevent a short-circuit between a commutator and a rotor core due to conductive particles generated from the commutator and a brush from occurring.

In one general aspect of the present disclosure, there is provided a motor, the motor comprising: a housing forming an exterior look of the motor; a rotor including a rotor core centrally arranged on the housing and penetrated by a rotation shaft, an insulator wrapping the rotor core, and a coil wound on the insulator; a stator interposed between the housing and the rotor and including a magnet opposite to the rotor core; a commutator positioned at an upper surface of the rotor and electrically connected to the core; a brush inside the housing to apply a current to the commutator; and a short-circuit prevention unit at an upper surface of the rotor core on a drop path of conductive particles in order to prevent the short-circuit between the rotor core and the commutator from being generated by the conductive particles generated by the commutator and the brush.

Preferably, but not necessarily, the rotor core may include a cylindrical core body with a rotation shaft hole to allow the rotation shaft to pass therethrough, and a plurality of core bars, each protruded from a periphery of the core body to a radially external direction, and the short-circuit prevention unit may be at an upper surface of the core body.

Preferably, but not necessarily, the short-circuit prevention unit may include a first short-circuit prevention unit covering an entire upper surface of the core body, and a second short-circuit prevention unit protruded along a periphery of the rotation shaft from an upper surface of the first short-circuit prevention unit.

Preferably, but not necessarily, the short-circuit prevention unit may include a first short-circuit prevention unit covering an entire upper surface of the core body, a second short-circuit prevention unit protruded along a periphery of the rotation shaft from an upper surface of the first short-circuit prevention unit, and a third short-circuit prevention unit protruded to an upper surface of a border between the core body and the core bar.

Preferably, but not necessarily, each of the first, second and third short-circuit prevention units may include an insulation material.

In an advantageous effect, a motor according to an exemplary embodiment of the present disclosure is with a short-circuit prevention unit on a path of conductive particles generated by contact with a brush and a commutator for transmitting a driving signal to a coil wound on a rotor, whereby a short-circuit between the rotor core and the commutator generated by conductive particles can be prevented to greatly expand the life of the motor and to prevent an erroneous operation of the motor.

DETAILED DESCRIPTION

Figure 1:
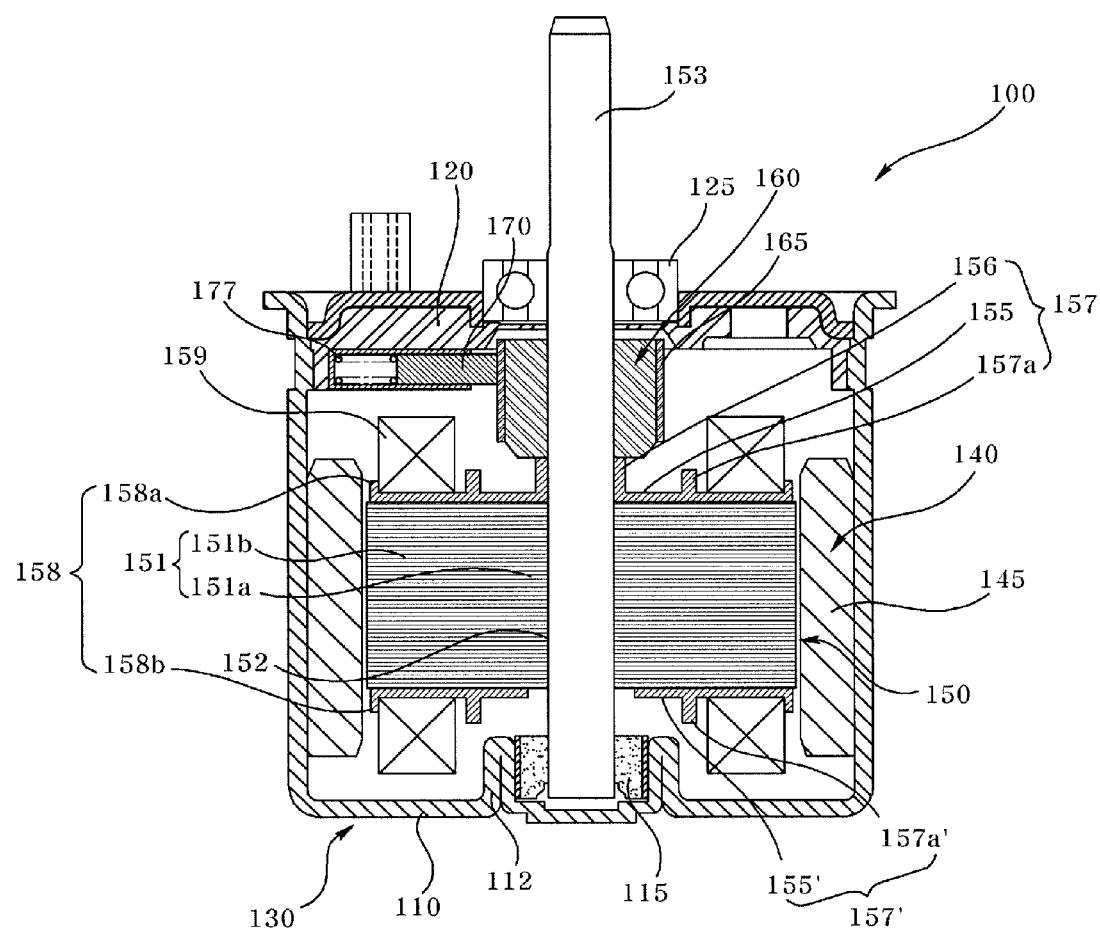
FIG. 1 is a cross-sectional view illustrating a motor according to an exemplary embodiment of the present disclosure.

Now, a motor according to exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. In the drawings, the size and relative sizes of layers, regions and/or other elements may be exaggerated or reduced for clarity. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 2:
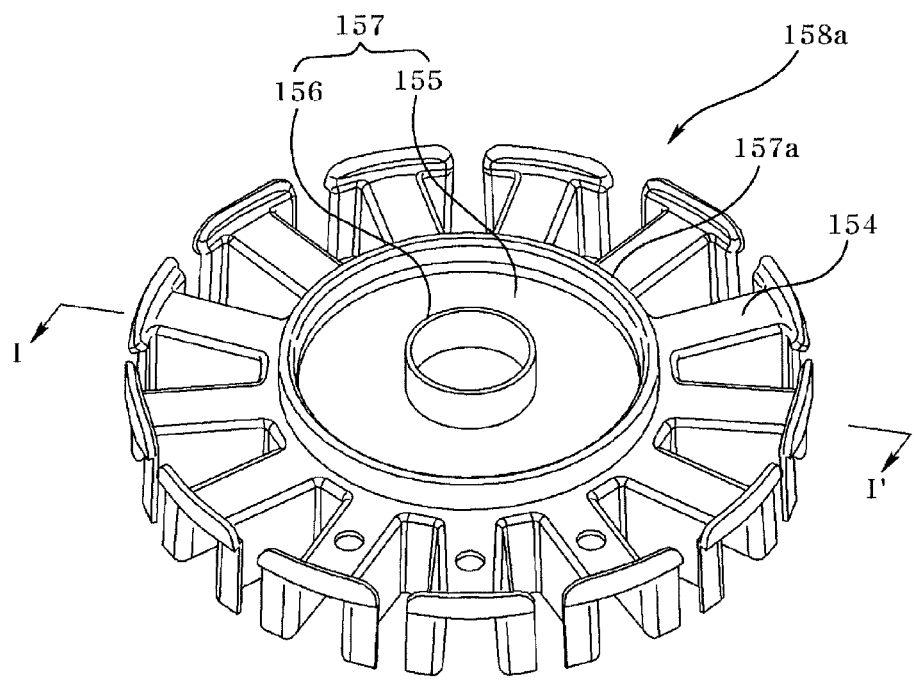
FIG. 2 is a perspective view illustrating an insulator coupled to the motor of FIG. 1.
Figure 3:
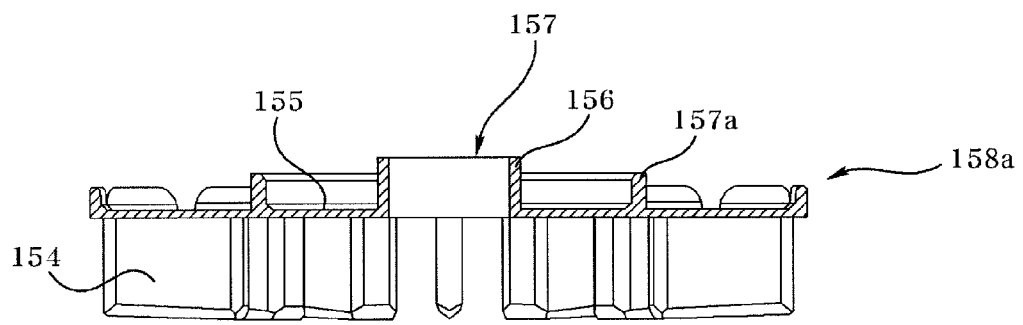
FIG. 3 is a cross-sectional view taken along line I-I' of FIG. 2.

FIG. 1 is a cross-sectional view illustrating a motor according to an exemplary embodiment of the present disclosure, FIG. 2 is a perspective view illustrating an insulator coupled to the motor of FIG. 1, and FIG. 3 is a cross-sectional view taken along line I-I' of FIG. 2.

Referring to FIGS. 1, 2 and 3, a motor (100) includes a housing (130), a stator (140), a rotor (150), a commutator (160) and a brush (170).

The housing (130) forms an exterior look of the motor (100), and houses the stator (140), the rotor (150), the commutator (160) and the brush (170).

The housing includes a housing body (110) and a housing cover (120).

The housing body (110) takes a shape of an upper surface-opened cylinder, and may take a shape of a cylindrical form, for example. The housing body (110) is formed at a floor surface with a bearing fixing unit (112) for fixing a bearing (115).

The housing cover (120) is coupled to an opened upper surface of the housing body (110), and may take a shape of a disc. The housing cover (120) is centrally formed with an opening and a bearing (125) is formed about the opening.

The stator (140) includes a plurality of magnets (145) arranged at an inner surface of the housing body (110) and each magnet (145) is circularly arranged along an inner surface of the housing body (110).

The rotor (150) is arranged inside the housing body (110), and is wrapped by being arranged at a position opposite to the magnet (145) of the stator (140).

The rotor (150) includes a rotor core (151), an insulator (158) and a coil (159).

The rotor core (151) includes a circular core body (151a) formed by being stacked with a plurality of thin silicon steel plates, and a plurality of core bars (151b) protruded from a periphery of the core body (151a) to a radially external direction, and the core body (151a) of the rotor core (151) is centrally formed with an upper surface of the rotor core (151) and a rotation shaft hole (152) penetrating a bottom surface opposite to the upper surface.

The rotation shaft hole (152) formed at the center of the core body (151a) of the rotor core (151) is press-fitted by the rotation shaft (153).

A distal end of the rotation shaft (153) is rotatably coupled to the bearing (115) formed at the housing body (110), and the other distal end of the rotation shaft (153) is rotatably coupled to the bearing (125) formed at the housing cover (120).

Referring to FIGS. 2 and 3, an insulator (158) includes a first insulator (158a) is respectively' arranged at the upper surfaces of the rotor core (151) and a second insulator (158b) arranged at the bottom surface of the rotor core (151), and is rotated along with the rotor core (151).

The insulator (158) prevents the rotor core (151) wrapping a periphery of the core bar (151b) of the rotor core (151) and the coil (159) from being electrically short-circuited.

The insulator (158) according to the exemplary embodiment of the present disclosure includes a core body wrapping the core bar (151b) of the rotor core (151) and a core insulation unit (154) preventing the coil (159) from being electrically short-circuited. The core insulation unit (154) takes a shape of "∩" at its cross-section to wrap the core bar (151b) of the rotor core (151).

That is, the coil (159) is wound on the core insulation unit (154) wrapping the core bar (151b) of the rotor core (151), and generates an electromagnetic field in response to a driving signal applied from outside.

Meanwhile, the motor (100) needs the commutator (160) and the brush (170) because the coil (159) is wound on the rotor core (151) of the rotor (150) rotating along with the rotation shaft (153).

The commutator (160) is coupled to the rotation shaft (153), and may be preferably formed at a position distanced from an upper surface of the rotor core (151). The commutator (160) includes a plurality of commutator bars (165), and each commutator bar (165) is circularly arranged at a periphery of the rotation shaft (153). Each commutator bar (165) is electrically connected to the coils (159) wound on the core insulation unit (154) of the insulator (158).

The brush (170) is arranged at a bottom surface of the housing cover (120), and takes a shape of a rod having electrical conductivity. The rod-shaped brush (170) is electrically brought into contact with the commutator bar (165) of the commutator (160) and provides a driving signal supplied from outside to each commutator bar (165).

In the exemplary embodiment of the present disclosure, the housing cover (120) includes an elastic member (177) repulsing the brush (170) toward the commutator bar (165) to allow the brush (170) to contact the commutator bar (165) at all times, where the elastic member (177) may include a coil spring, for example.

In a case the commutator bar (165) is rotated along with the rotation shaft (153) at a high speed, while the brush (170) applies a pressure to the commutator bar (165) at all times, a large quantity of conductive particles are generated by wear or abrasion of the brush (170) and/or the commutator bar (165), and the amount of conductive particles increases in proportion to use time of the motor (100).

The conductive particles generated by the brush (170) and rotating commutator bar (165) drop down due to gravity, and immediately reach the insulator (158) and the rotor core (151).

Although the conductive particles cannot easily accumulate on the insulator (158) and the rotor core (151), because of lightness of the conductive particles and high speed rotation of the rotor (150), the conductive particles continuously gather on the insulator (158) and the rotor core (151), as the use time of the motor (100) lapses because the large quantity of conductive particles cannot be discharged at a time.

In a case the conductive particles continuously collect on the insulator (158) and the rotor core (151), an accumulated height of the conductive particles gradually increases to create an electrical short-circuit on the conductive rotor core (151) and the commutator bars (165) that are electrically connected.

In the exemplary embodiment of the present disclosure, in order to prevent the rotor core (151) and the commutator bars (165) from being short-circuited by the conductive particles, the insulator (158) is formed with a short-circuit prevention unit (157, 157') preventing the commutator bars (165) of the commutator (160) from being mutually short-circuited with the rotor core (151), as illustrated in FIGS. 2 and 3.

The short-circuit prevention unit (157, 157') is preferably arranged on a drop path of the conductive particles generated by the brush (170) and the commutator (160), and may be also formed on the core body (151a) of the rotor core (151).

The short-circuit prevention unit (157) of the first insulator (158a) includes a first short-circuit prevention unit (155) and a second short-circuit prevention unit (156).

The first short-circuit prevention unit (155) may be extended from an inner surface of the core insulation unit (154) of the insulator (158) to a direction toward the rotation shaft (153) to prevent the conductive particles from being brought into contact with the conductive rotor core (151) as the conductive particles cover an upper surface of the core body (151a) of the rotor core (151), which is a drop path of the conductive particles.

The second short-circuit prevention unit (156) prevents the conductive particles from being brought into contact with a periphery of the conductive rotation shaft (153), and may be extended along the periphery of the rotation shaft (153) from a distal end of the first short-circuit prevention unit (155), for example.

The second short-circuit prevention unit (156) may be extended to a bottom surface of the commutator (160), for example. Alternatively, a gap may be formed between the distal end of the second short-circuit prevention unit (156) to the bottom surface of the commutator (160).

The short-circuit prevention unit (157') of the second insulator (158b) includes a fourth short-circuit prevention unit (155') and a fifth short-circuit prevention unit (157'a). The fourth short-circuit prevention unit (155') partially covers the core body (151a) of the rotor core (151) and the fifth short-circuit prevention unit (157'a) is substantially identical to the third short-circuit prevention unit (157a) of the first insulator (158b).

Meanwhile, a third short-circuit prevention unit (157a) may be further formed between the first short-circuit prevention unit (155) and the coil (159) in order to inhibit the conductive particles from being introduced to a direction the coils (159) are wound, because the coils (159) wound on the coil insulation unit (154) of the insulator may be mutually short-circuited by the large quantity of conductive particles formed by the brush (170) and the commutator (160). That is, the third short-circuit prevention unit (157a) may be formed at an upper surface of a border between the core body (151a) of the rotor core (151) and the core bar (151b), and may be protruded in a circular fence shape from the first short-circuit prevention unit (155).

In the exemplary embodiment of the present disclosure, the first, second and third short-circuit prevention unit (155, 156, 157a) arranged on a drop path of the large quantity of conductive particles formed by the brush (170) and the commutator (160) may be integrally formed, and may be funned by injection molding of synthetic resin of insulation material.

Although the exemplary embodiment of the present disclosure has illustrated and explained the short-circuit prevention unit (157) including the first, second and third short-circuit prevention unit (155, 156, 157a) arranged on the drop path of the large quantity of conductive particles formed by the brush (170) and the commutator (160), alternatively, an insulation film may be formed on each of the rotor core (151) and the rotation shaft (153) reached by the dropping conductive particles.

The insulation film may be formed by coating the exposed rotor core (151) and the rotation shaft (153) with synthetic resin melted in volatile solvent and by volatilizing the volatile solvent. The insulation film may be formed with a thickness more than a predetermined level in order to improve an insulation performance of the insulation film, and the insulation film may be repetitively formed at leas twice.

As apparent from the foregoing, the motor according to an exemplary embodiment of the present disclosure has an advantageous effect in that it is formed with a short-circuit prevention unit on a path of conductive particles generated by contact with a brush and a commutator for transmitting a driving signal to a coil wound on a rotor, whereby a short-circuit between the rotor core and the commutator generated by conductive particles can be prevented to greatly expand the life of the motor and to prevent an erroneous operation of the motor.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A motor having a short-circuit prevention unit, the motor comprising:
    a housing;
    a rotor including a rotor core centrally arranged at the housing and penetrated by a rotation shaft, wherein the rotor core includes a circular core body with a rotation shaft hole for the rotation shaft and a plurality of core bars each protruded radially outward from a periphery of the core body;
    an insulator wrapping an outer surface of the rotor core, wherein the insulator includes a core body wrapping the circular core body of the rotor core and a core insulation unit wrapping the core bars of the rotor core and wound by a coil;
    a stator interposed between the housing and the rotor and including a magnet opposite to the rotor core;
    a commutator positioned at an upper surface of the rotor and electrically connected to the coil; and
    a brush inside the housing to apply a current to the commutator;
    wherein the insulator includes a first insulator disposed on the upper surface of the rotor core and a second insulator disposed on a bottom surface of the rotor core and being different in shape from the first insulator;
    wherein the first insulator includes a circular first short-circuit prevention unit formed in a channel shape by extending from a distal end of the core insulation unit toward the rotation shaft and wherein the first short-circuit prevention unit covers an entire upper surface of the core body of the rotor core, a second short-circuit prevention unit extended toward the commutator along a periphery of the rotation shaft from a distal end of the first short-circuit prevention unit, and a third short-circuit prevention unit formed between the other distal end of the first short-circuit prevention unit and the core insulation unit;
    wherein the first, second, and third short-circuit prevention units are integrally formed in a single piece with the core insulation unit;
    wherein the third short-circuit prevention unit is formed on an upper surface of the first insulator at a border between the core body and the core bars,
    wherein the second insulator includes a circular fourth short-circuit prevention unit formed in a channel shape by extending from a distal end of the core insulation unit toward the rotation shall and wherein the fourth short-circuit prevention unit partially covers a bottom surface of the core body of the rotor core,
    wherein the second insulator further includes a fifth short-circuit prevention unit integrally formed with the fourth short-circuit prevention unit between the fourth short-circuit prevention unit and the core insulation unit,
    wherein a distal end of the second short-circuit prevention unit contacts a bottom surface of the commutator,
    wherein an inner diameter of the second short-circuit prevention unit and an outer diameter of the shaft are the same, and
    wherein a height of the third short-circuit prevention unit and a height of the filth short-circuit prevention unit are each smaller than a height of the second short-circuit prevention unit and larger than a height of the core insulation unit.

2. The motor of claim 1, wherein each of the first and second short-circuit prevention units of the insulator is formed with an insulation material.

3. The motor of claim 1, wherein the core insulation unit wraps the core bars of the rotor core and is configured to inhibit the coil from being electrically short-circuited.

4. The motor of claim 1, wherein the third short-circuit prevention unit is protruded in a circular shape.

5. The motor of claim 4, wherein the first short-circuit prevention unit is extended to form a circular recess between the second short-circuit prevention unit and the third short-circuit prevention unit.

6. The motor of claim 5, wherein the first, second, and third short-circuit prevention units are integrally formed by injection molding.

7. The motor of claim 1, wherein an insulation film is formed on each of the rotor core and the rotation shaft by coating with synthetic resin.

8. The motor of claim 1, wherein a distal end of the fourth short-circuit prevention unit is spaced apart from the periphery of the rotation shaft.

9. The motor of claim 1, wherein the third short-circuit prevention unit of the first insulator and the fifth short-circuit prevention unit of the second insulator are different in shape.

10. The motor of claim 1, wherein the fifth short-circuit prevention unit is formed in a circular shape and extends in a direction away from the first insulator.

11. The motor of claim 1, wherein the fourth and fifth short-circuit prevention units are integrally formed in a single piece with the core insulation unit.

* * * * *